United States Patent
Rabovitser et al.

(10) Patent No.: US 7,421,835 B2
(45) Date of Patent: Sep. 9, 2008

(54) AIR-STAGED REHEAT POWER GENERATION SYSTEM

(75) Inventors: Iosif K. Rabovitser, Skokie, IL (US); Serguei Nester, Elk Grove Village, IL (US); David J. White, San Diego, CA (US)

(73) Assignee: Gas Technology Institute, Des Plaines, IL (US)

( * ) Notice: Subject to any disclaimer, the term of this patent is extended or adjusted under 35 U.S.C. 154(b) by 526 days.

(21) Appl. No.: 11/217,935

(22) Filed: Sep. 1, 2005

(65) Prior Publication Data
US 2007/0044481 A1 Mar. 1, 2007

(51) Int. Cl.
*F02C 3/28* (2006.01)
*F02C 6/18* (2006.01)

(52) U.S. Cl. ............ 60/39.12; 60/39.17; 60/39.182; 60/39.52

(58) Field of Classification Search ........... 60/39.12, 60/39.17, 39.182, 39.511, 39.512, 784, 39.52
See application file for complete search history.

(56) References Cited

U.S. PATENT DOCUMENTS

| | | | | | |
|---|---|---|---|---|---|
| 2,621,475 | A | * | 12/1952 | Loy | 60/39.17 |
| 2,675,672 | A | * | 4/1954 | Schorner | 60/39.12 |
| 4,028,883 | A | * | 6/1977 | Meyer-Kahrweg | 60/39.17 |
| 5,212,941 | A | * | 5/1993 | Croonenbrock et al. | 60/39.17 |
| 6,609,582 | B1 | | 8/2003 | Botti et al. | |
| 6,957,539 | B2 | * | 10/2005 | Lebas et al. | 60/39.17 |

* cited by examiner

*Primary Examiner*—Louis J Casaregola
(74) *Attorney, Agent, or Firm*—Mark E. Fejer

(57) ABSTRACT

A two-stage power generation system having a compressed air source with two compressed air outlets, one of which provides compressed air to the first stage of power generation and the other of which provides compressed air to the second stage of power generation. All of the fuel for the two-stage power generation system is introduced into the first stage. Exhaust gases from the first stage are introduced into a fuel inlet of the second stage of power generation. The first stage preferably includes a gas turbine operated in partial oxidation mode. The exhaust gases from the partial oxidation gas turbine contain thermal and chemical energy, both of which are used in the second stage.

16 Claims, 12 Drawing Sheets

AIR-STAGED REHEAT POWER GENERATION SYSTEM

BACKGROUND OF THE INVENTION

1. Field of the Invention

This invention relates to a method and apparatus for generating power. This invention relates to a method and apparatus for generating power using gas turbines. This invention relates to a method and apparatus for generating power using gas turbines in which the fuel-to-power efficiency compared to conventional gas turbine power generating systems is improved and $NO_x$ emissions are reduced. This invention further relates to a method and apparatus for generating power using air-staged reheat gas turbines. In addition to providing significant improvements in both system efficiency and $NO_x$ emissions compared to conventional systems, this invention reduces the amount of thermal energy in the turbine exhaust of gas turbines employed in the system.

2. Description of Related Art

Gas turbines are one of the major sources for power generation in use today. However, the best efficiency achieved to date using gas turbines is only about 38%. One significant drawback of gas turbines is that a significant portion of fuel energy input to the gas turbines, approximately 62-75%, is lost in the turbine exhaust. This exhaust energy is in the form of thermal energy only, which makes it difficult to use for effective power generation. Staged reheat gas turbines have the capability to improve both efficiency and $NO_x$ emissions. In some gas turbines, fuel staging has been employed. Fuel staging improves system efficiency but has limited application due to combustion instability problems, particularly in the first stage, high $NO_x$ emissions, and a large portion of thermal energy, about 55-65%, in the turbine exhaust. It will, therefore, be apparent that there is a need for a power generation system employing gas turbines which provides significant improvements in both system efficiency and $NO_x$ emissions, as well as reduces the amount of thermal energy in the turbine exhaust.

SUMMARY OF THE INVENTION

Accordingly, it is one object of this invention to provide a power generation system utilizing gas turbines which has a greater efficiency than conventional gas turbine-based power generation systems.

It is another object of this invention to provide a power generation system employing gas turbines which produces lower $NO_x$ emissions than conventional gas turbine-based power generation systems.

It is still another object of this invention to provide a power generation system employing gas turbines in which the amount of thermal energy in the turbine exhaust is lower than with conventional gas turbine-based power generation systems.

These and other objects of this invention are addressed by a power generation system comprising a compressed air source having two compressed air outlets, one of which provides compressed air to a first stage power generation means for generating power and the other of which provides compressed air to a second stage power generation means for generating power. The system further comprises a fuel source means for providing 100% of a fuel for the power generation system to the first stage power generation means. Fluid communication means are provided whereby exhaust gases from the first stage power generation means are introduced into a fuel inlet of the second stage power generation means. The invention provides high efficiency and low emissions power generation using air-staged reheat systems where, in the first stage, a portion of the total fuel energy input is converted to power with very high fuel-to-power efficiency, and where, in the second stage, the exhaust gas from the first stage is utilized to convert the remaining fuel energy contained therein to power. The first stage is preferably a gas turbine operated in partial oxidation mode. The exhaust gases from the partial oxidation gas turbine contain thermal and chemical energy, both of which are used in the second stage. One of the benefits of the second stage is that, in several applications, no pressure from the first stage exhaust gas is required. Moreover, the second stage can provide some negative back pressure to the first stage.

While first stage power generation is achieved utilizing a gas turbine, the second stage power generation may be achieved utilizing power generation means selected from the group consisting of internal combustion engine, Stirling engine, fuel-fired boiler, vacuum turbine and combinations thereof. For embodiments in which an internal combustion engine or vacuum turbine is employed, the first stage exhaust gas is sucked into the second stage, which provides more efficient energy utilization in the whole system.

Another benefit of the power generation system of this invention is that the stages are formed in combinations of serial and parallel connections. In most cases, the fuel is utilized serially, that is, 100% of the fuel mass and a portion of the fuel chemical energy is used in the first stage, and 100% of the fuel mass and remaining portion of the fuel chemical energy is used in the second stage. Air is used in parallel and the exhaust of the source of compressed air is split between first and second stages to provide more advanced system performance. In accordance with one embodiment of this invention, flue gas recirculation and/or steam injection in one or both stages allows operation at total low excess air, which ultimately improves overall system efficiency.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The air-staged power generation system in accordance with this invention comprises two stages of power generation operated in series with fuel and operated in parallel with air or other suitable oxidant, e.g. oxygen-enriched air. The first stage employs a partial oxidation gas turbine (POGT) and the second stage employs a power generation unit preferably selected from the group consisting of a conventional low-pressure gas turbine (LPGT), an internal combustion engine, a Stirling engine, a fuel-fired boiler, a vacuum turbine, and combinations thereof. The total (100%) amount of air to the system is supplied through a low-pressure air compressor (LP AC), the discharge of which is split to supply air in parallel to the first and second stages. The total (100%) amount of fuel to the system is supplied to a partial oxidation reactor in the first stage, but only a portion of the fuel energy is used in the first stage. The partial oxidation reactor operates under substoichiometric conditions, preferably at a stoichiometric ratio in the range of about 0.25 to about 0.95. A portion of the fuel chemical energy is converted to thermal energy while the remaining portion of fuel chemical energy is transferred to the second stage. The thermal energy from the utilized portion of fuel chemical energy in the partial oxidation reactor of the first stage is converted to mechanical/electrical energy in a partial oxidation gas turbine, and the partial oxidation gas turbine exhaust gas that contains unused portions of both chemical and thermal energy is supplied to a second stage low-pressure combustor (LPC). In addition to the partial oxidation turbine exhaust gas, a portion (about 70%) of the total air is fed to the low-pressure combustor wherein the combustion of the fuel is completed and the second portion of thermal energy is supplied to a low-pressure gas turbine (LPGT) for conversion to mechanical/electrical power. The thermal energy from the low-pressure gas turbine exhaust gas may be utilized for second stage air preheating in an air heater and for steam generation in a heat recovery steam generator (HRSG). A portion of the flue gases from the stack of the heat recovery steam generator is recirculated back to the system and injected to the inlet of the low-pressure air compressor (LPAC). The recirculated flue gas enables operation of the system at low total excess air (less than about 50%) which increases overall system efficiency. The steam and/or flue gases, comprising less than about 5% by volume oxygen, may be used for cooling/injection into the partial oxidation reactor and/or the partial oxidation gas turbine.

Figure 1:
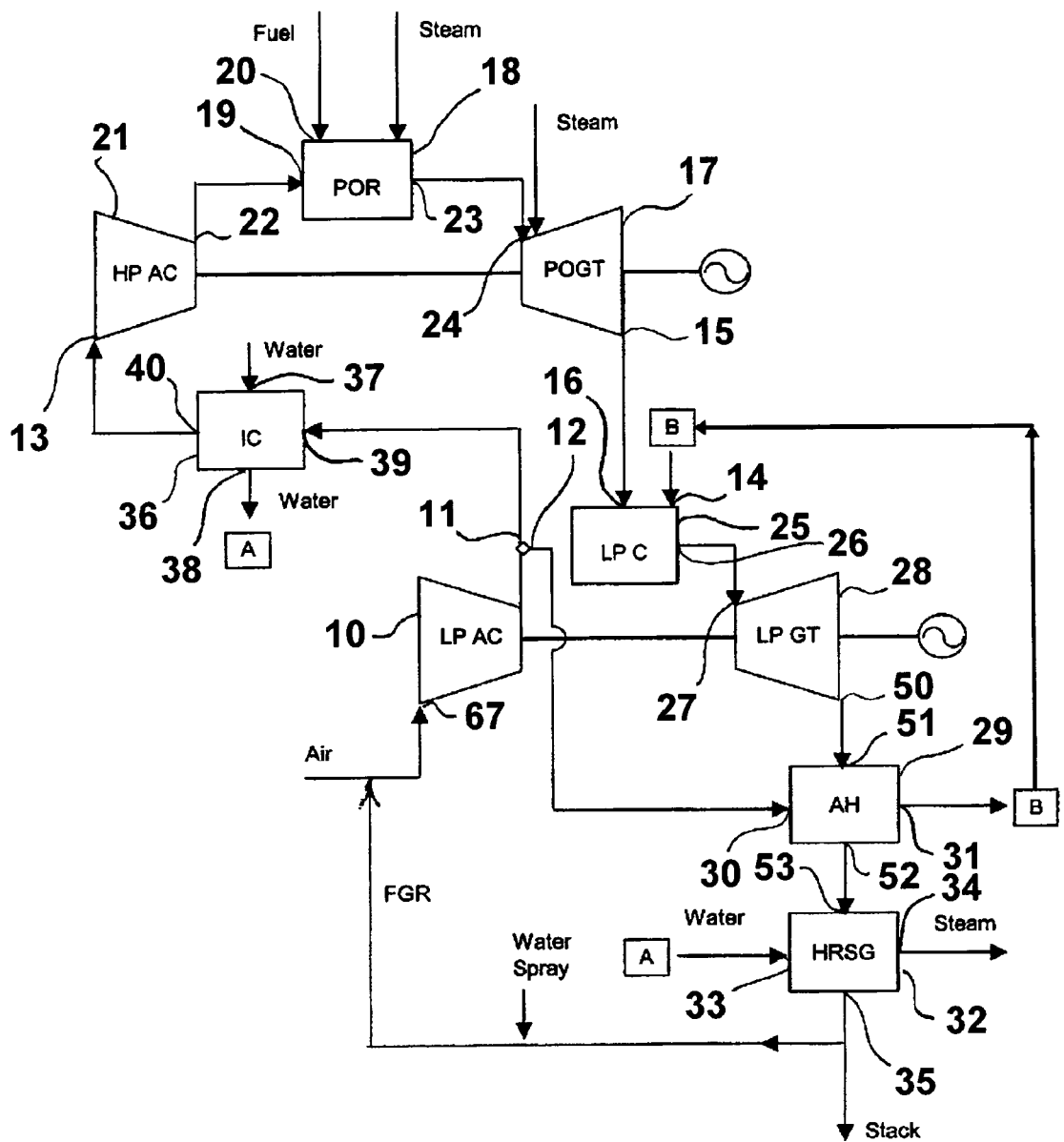
FIG. 1 is a schematic diagram of an air-staged power generation system in accordance with one embodiment of this invention.

FIG. 1 shows an air-staged power generation system in accordance with one embodiment of this invention comprising first and second stage power generation means operated in series with fuel and operated in parallel with air or oxidant. The first stage power generation means for generating power is adapted to receive a first portion of compressed air from a compressed air source 10 having a first compressed air outlet 11 and a second compressed air outlet 12 and comprises a first stage compressed air inlet 13 in fluid communication with the first compressed air outlet 11. The second stage power generation means for generating power is adapted to receive a second portion of compressed air from the compressed air source 10 and comprises a second stage compressed air inlet 14 in fluid communication with the second compressed air outlet 12. The system further comprises fuel source means for providing 100% of the fuel for the power generation system to the first stage power generation means and fluid communication means for providing fluid communication between a first stage exhaust gas outlet 15 of the first stage generation means and a second stage fuel inlet 16 of the second stage power generation means.

As shown in FIG. 1, the first stage power generation means in accordance with one embodiment of this invention comprises partial oxidation reactor (POR) 18 having a high-pressure reactor compressed air inlet 19, a first stage fuel inlet 20 through which 100% of the fuel for the power generation system is introduced, and a reactor exhaust gas outlet 23. The first stage power generation means further comprises a partial oxidation gas turbine (POGT) 17 having a high-pressure turbine exhaust gas inlet 24 in fluid communication with reactor exhaust gas outlet 23 of partial oxidation reactor 18 and having a turbine exhaust gas outlet corresponding to first stage exhaust gas outlet 15. High-pressure air is provided to the first stage power generation means by high-pressure air compressor 21 having an air inlet corresponding to first stage compressed air inlet 13 and having a high-pressure compressed air outlet 22, which high-pressure compressed air outlet 22 is in fluid communication with high pressure reactor compressed air inlet 19 of partial oxidation reactor 18. High-pressure air compressor 21, in accordance with one embodiment of this invention is operably connected to and driven by partial oxidation gas turbine 17.

The second stage power generation means in accordance with one embodiment of this invention comprises second stage fuel inlet 16, which is in fluid communication with the turbine exhaust gas outlet of partial oxidation gas turbine 17, which outlet corresponds to first stage exhaust gas outlet 15. The second stage power generation means comprises a power generation unit in which combustion of the fuel in the turbine exhaust gas is completed. Suitable power generation units are selected from the group consisting of a gas turbine, an internal combustion engine, a Stirling engine, a vacuum turbine, a fuel-fired boiler, and combinations thereof, each of which is provided with a second stage exhaust gas inlet 27. In accordance with the embodiment shown in FIG. 1, the second stage power generation means comprises low-pressure combustor (LPC) 25 having a combustor fuel inlet corresponding to second stage fuel inlet 16 and having a low-pressure combustor exhaust gas outlet 26 in fluid communication with second stage exhaust gas inlet 27. As shown in FIG. 1, the second stage power generation means further comprises low-pressure gas turbine (LPGT) 28 having a turbine exhaust gas outlet 50. Disposed downstream of low-pressure gas turbine 28 is an air heater (AH) 29, which is in heat exchange communication with the hot exhaust gas from the second stage power generation means. Air heater 29 comprises a cool compressed air inlet 30 in fluid communication with second compressed air outlet 12 and a heated compressed air outlet 31 in fluid communication with second stage compressed air inlet 14 of low-pressure combustor 25. To provide the heat exchange between the hot turbine exhaust gases and the cool compressed air, air heater 29 is provided with an air heater exhaust gas inlet 51 in fluid communication with turbine exhaust gas outlet 50 and an air heater exhaust gas outlet 52. Disposed downstream of air heater 29 in accordance with one embodiment of this invention is a heat recovery steam generator (HRSG) 32 in heat exchange communication with the exhaust gas downstream of the air heater having a water inlet 33, a steam outlet 34, an exhaust gas inlet 53, and a spent exhaust gas outlet 35. Spent exhaust gas outlet 35 is in fluid communication with the compressed air source, thereby providing recirculation of the exhaust gases back into the system.

In accordance with one preferred embodiment of this invention, the air-staged power generation system further comprises an intercooler 36 having an intercooler water inlet 37, an intercooler water outlet 38, an intercooler compressed air inlet 39 and an intercooler compressed air outlet 40, which intercooler is disposed in the path of compressed air communication between first compressed air outlet 11 and first stage compressed air inlet 13. Intercooler water outlet 38 is in fluid communication with water inlet 33 of heat recovery steam generator 32.

Figure 2:
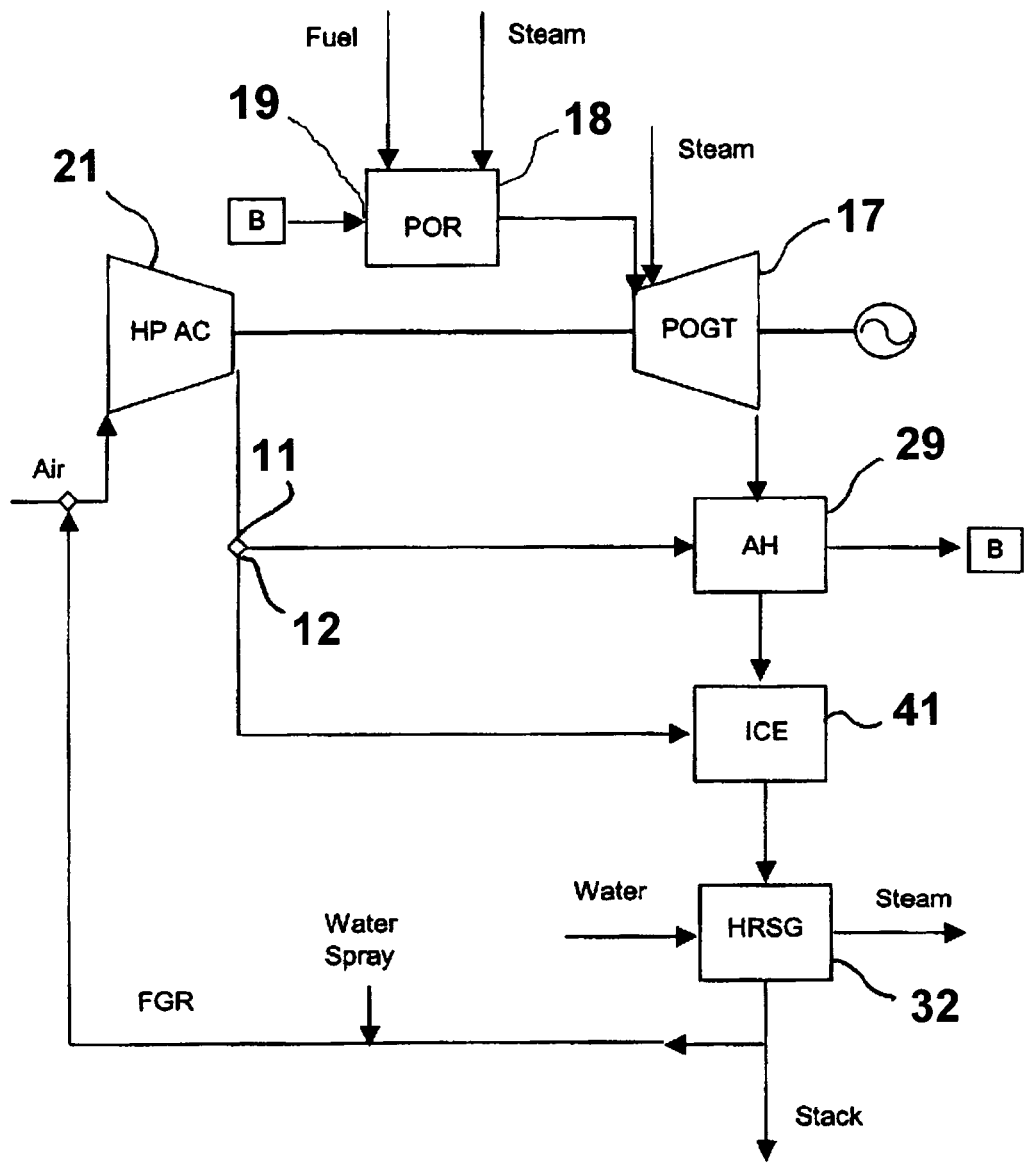
FIG. 2 is a schematic diagram of an air-staged power generation system employing an internal combustion engine in accordance with one embodiment of this invention.

FIG. 2 shows an air-staged power generation system in accordance with one embodiment of this invention in which the second stage power generation unit comprises an internal combustion engine (ICE) 41. The total air is split between the first and second stages as before and introduced into both the partial oxidation reactor 18 and the internal combustion engine 41 at given pressures. Fuel is supplied in series to the first stage partial oxidation reactor 18 and partial oxidation gas turbine 17, and the exhaust from the partial oxidation gas turbine 17 is introduced into the internal combustion engine 41. More particularly, the fuel gas from the partial oxidation gas turbine exhaust is sucked in by the internal combustion engine, and compressed air is injected into the internal combustion engine at a point at which the fuel gas has already been compressed inside the internal combustion engine. The exhaust gas from the internal combustion engine is then introduced into the heat recovery steam generator 32. This kind of internal combustion engine operation is a reversal of the conventional internal combustion engine in which the air is sucked in and the fuel is injected under pressure. Using this "reverse" internal combustion engine in the second stage has real advantages in both efficiency increase and $NO_x$ reduction.

Figure 3:
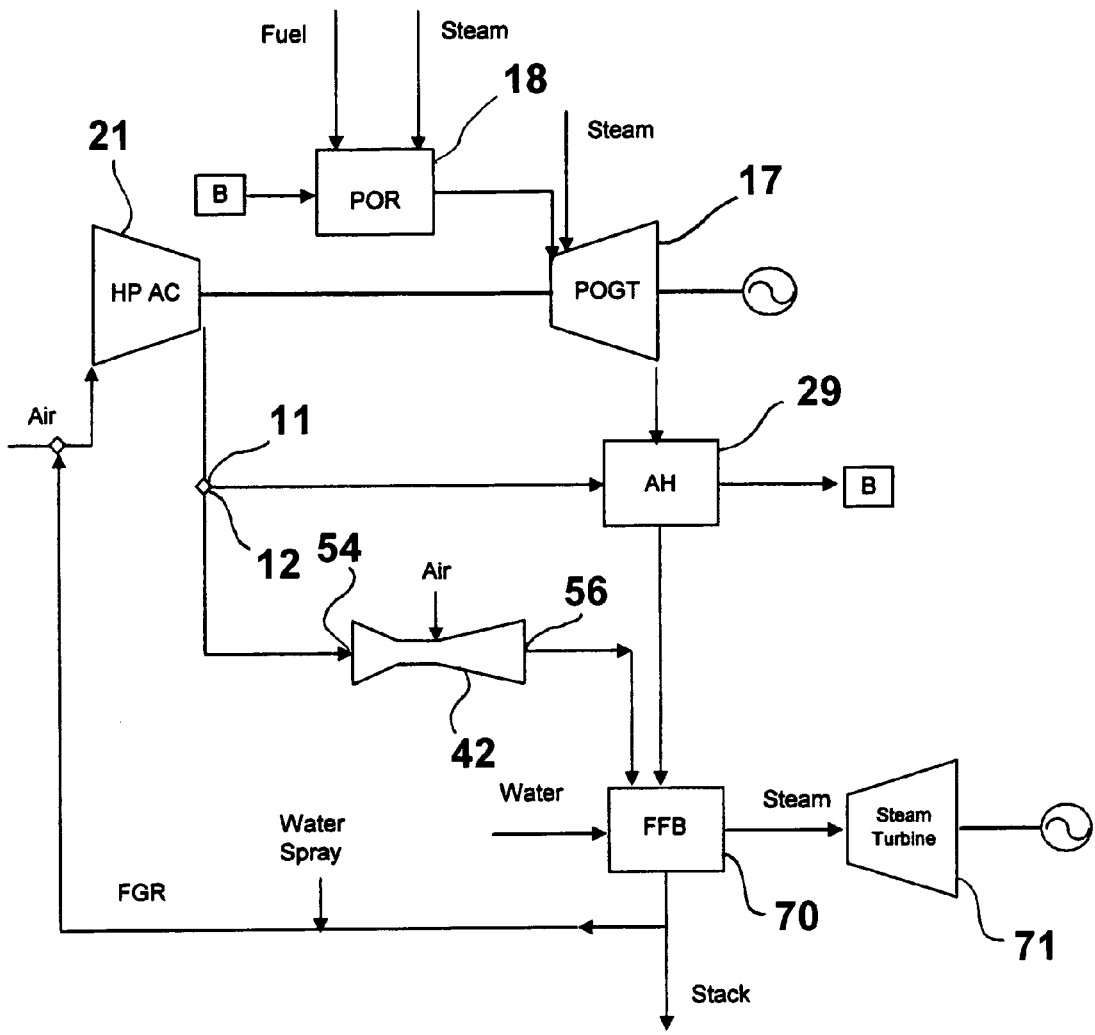
FIG. 3 is a schematic diagram of an air-staged power generation system employing a fuel-fired boiler for steam generation in accordance with one embodiment of this invention.

In the embodiment shown in FIG. 3, the second stage power generation means comprises a fuel-fired boiler (FFB) 70 in which the unburned fuel in the partial oxidation gas turbine exhaust gases is burned for power generation. Fuel-fired boiler 70 receives the exhaust gases from air heater 29 in which the temperature of the exhaust gases has been reduced for preheating of the air to the partial oxidation reactor 18. Steam generated by the fuel-fired boiler is transferred into steam turbine 71 for power generation. At least a portion of the flue gases from fuel-fired boiler 70 are recirculated to high-pressure air compressor 21. In accordance with one embodiment of this invention, an inducer 42 having an induced air inlet 54 in fluid communication with the compressed air source and an induced air outlet 56 in fluid communication with fuel-fired boiler 70 is inserted between the first and second power generation stages and provides combustion air to fuel-fired boiler 70.

Figure 4:
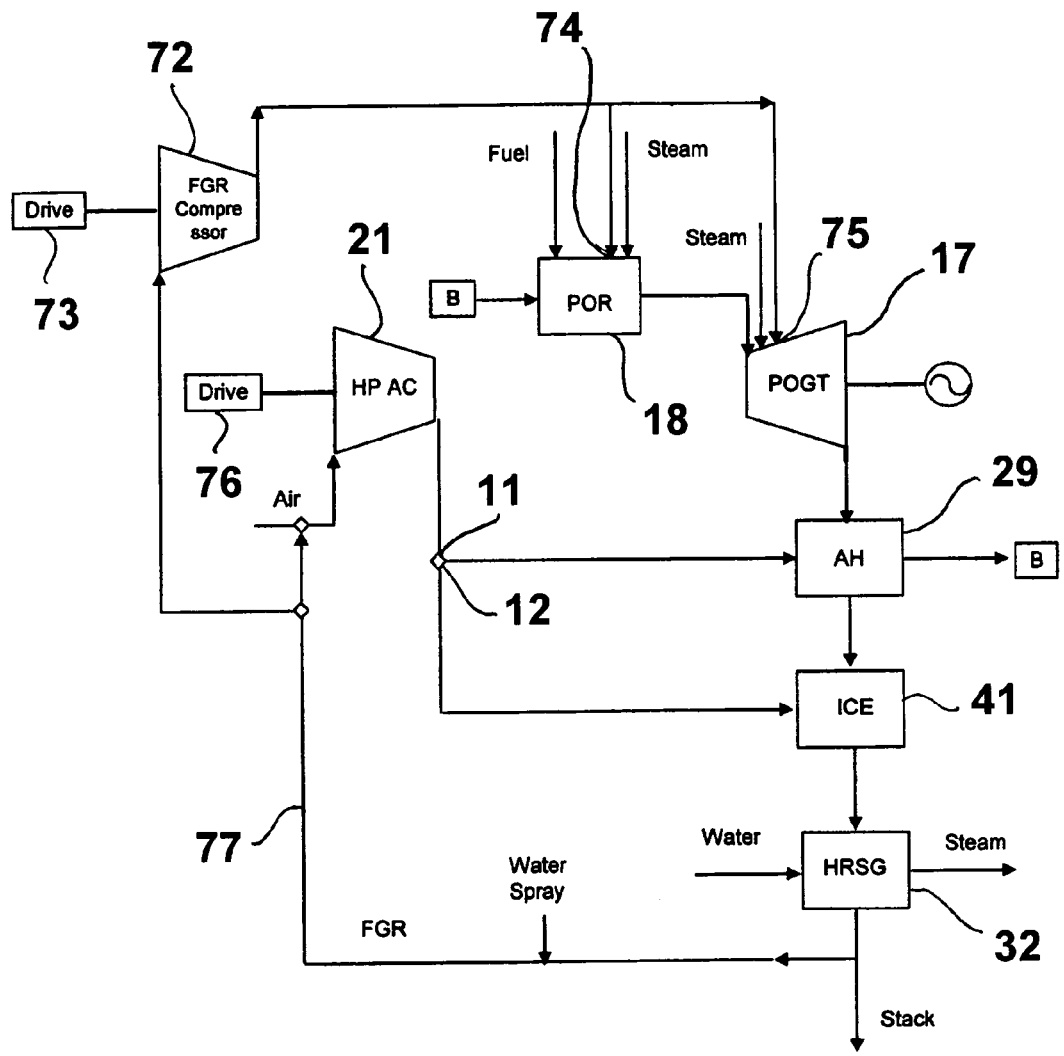
FIG. 4 is a schematic diagram of an air-staged power generation system employing flue gas recirculation (FGR) and a first stage compressed air source driven by a separate drive in accordance with one embodiment of this invention.

In the embodiment of the power generation system of this invention shown in FIG. 4, the second stage power generation unit comprises internal combustion engine 41 which receives unburned fuel in the exhaust gases of partial oxidation gas turbine 17 by way of air heater 29. The exhaust gases from internal combustion engine 41 are introduced into heat recovery steam generator 32, generating steam and producing reduced temperature exhaust gases, at least a portion of which is recirculated to the first stage power generation means. In accordance with one embodiment of this invention as shown in FIG. 4, at least a portion of the reduced temperature exhaust gases, i.e. flue gases, is flowed through line 77 into a flue gas compressor 72 for compression and introduction directly into partial oxidation reactor flue gas inlet 74 of partial oxidation reactor 18 and/or partial oxidation gas turbine flue gas inlet 75 of partial oxidation gas turbine 17. As shown in FIG. 4, flue gas compressor 72 is driven by a separate drive 73. Suitable drives including electric motors, internal combustion engines, and a separate gear box connected to the turbine shaft. Also as shown in FIG. 4, in accordance with one embodiment of this invention, high-pressure air compressor 21 is independently driven by drive 76 operably connected to high-pressure air compressor 21.

Figure 5:
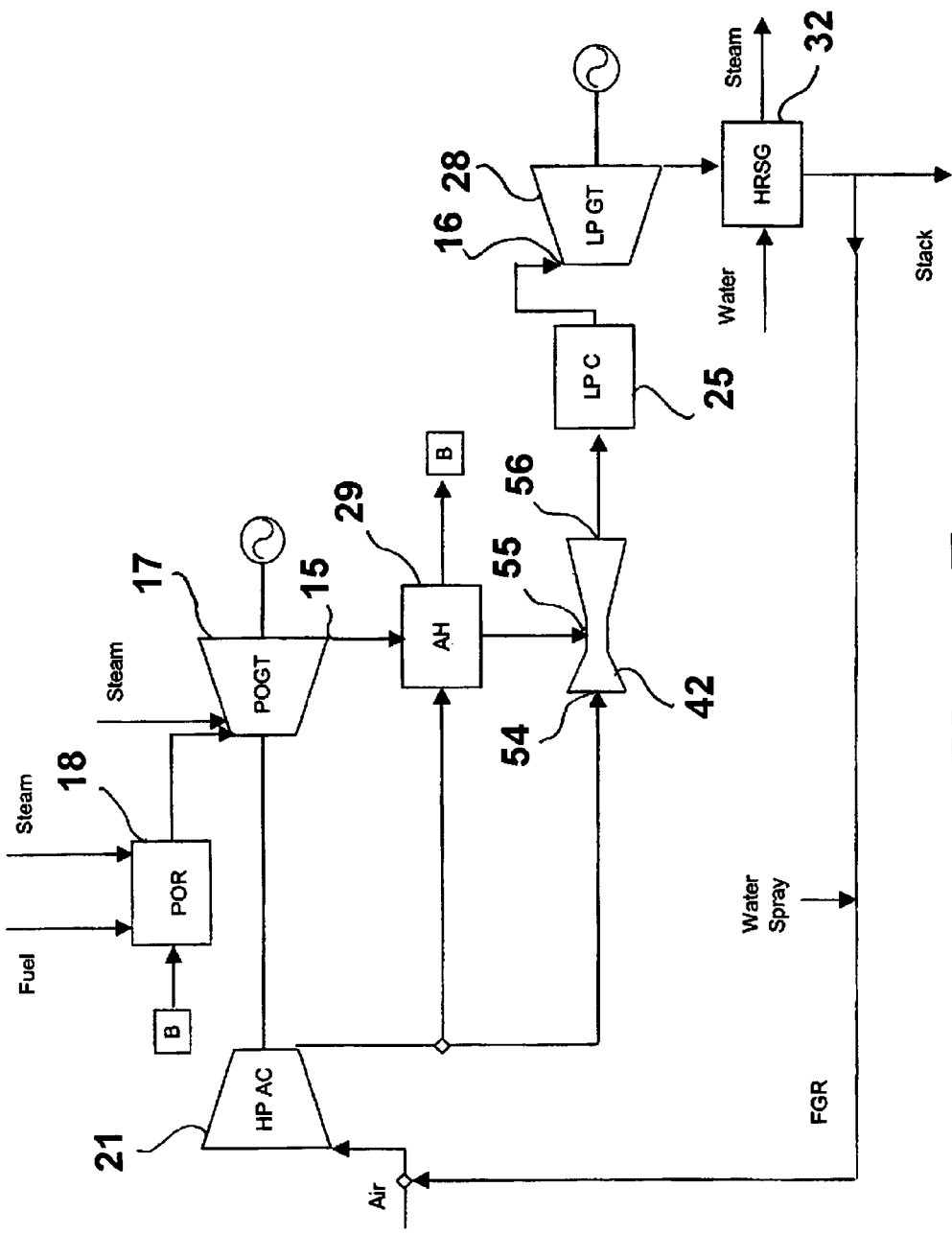
FIG. 5 is a schematic diagram of an air-staged power generation system employing an inducer for communicating air between the first and second power generation stages in accordance with one embodiment of this invention.

FIG. 5 shows yet another embodiment of the power generation system of this invention. As shown therein, inducer 42 having an inducer air inlet 54 in fluid communication with the compressed air source, an inducer exhaust gas inlet 55 in fluid communication with turbine exhaust gas outlet 15, and an exhaust gas/air mixture outlet 56 in fluid communication with second stage fuel inlet 16, is inserted between the first and second power generation stages, providing suction of the exhaust gas from the turbine exhaust gas outlet 15 of the partial oxidation gas turbine 17 using air pressure from the high-pressure air compressor and providing the exhaust gas/air mixture to the low-pressure combustor 25. The complete combustion products at given temperature and pressure from low-pressure combustor 25 are introduced through second stage fuel inlet 16 into low-pressure gas turbine 28 for second stage power generation. In accordance with one embodiment of this invention as shown in FIG. 6, interposed between turbine exhaust gas outlet 15 of the partial oxidation gas turbine 17 and inducer 42 is an evaporator 46 having an evaporator water inlet 61 in fluid communication with economizer 45, an evaporator exhaust gas inlet 62 in fluid communication with turbine exhaust gas outlet 15, an evaporator exhaust gas outlet 63, and a steam outlet 64, whereby water from economizer 45 is introduced into evaporator 46 and heated by the partially combusted exhaust gas from partial oxidation gas turbine 17 to produce steam.

Figure 6:
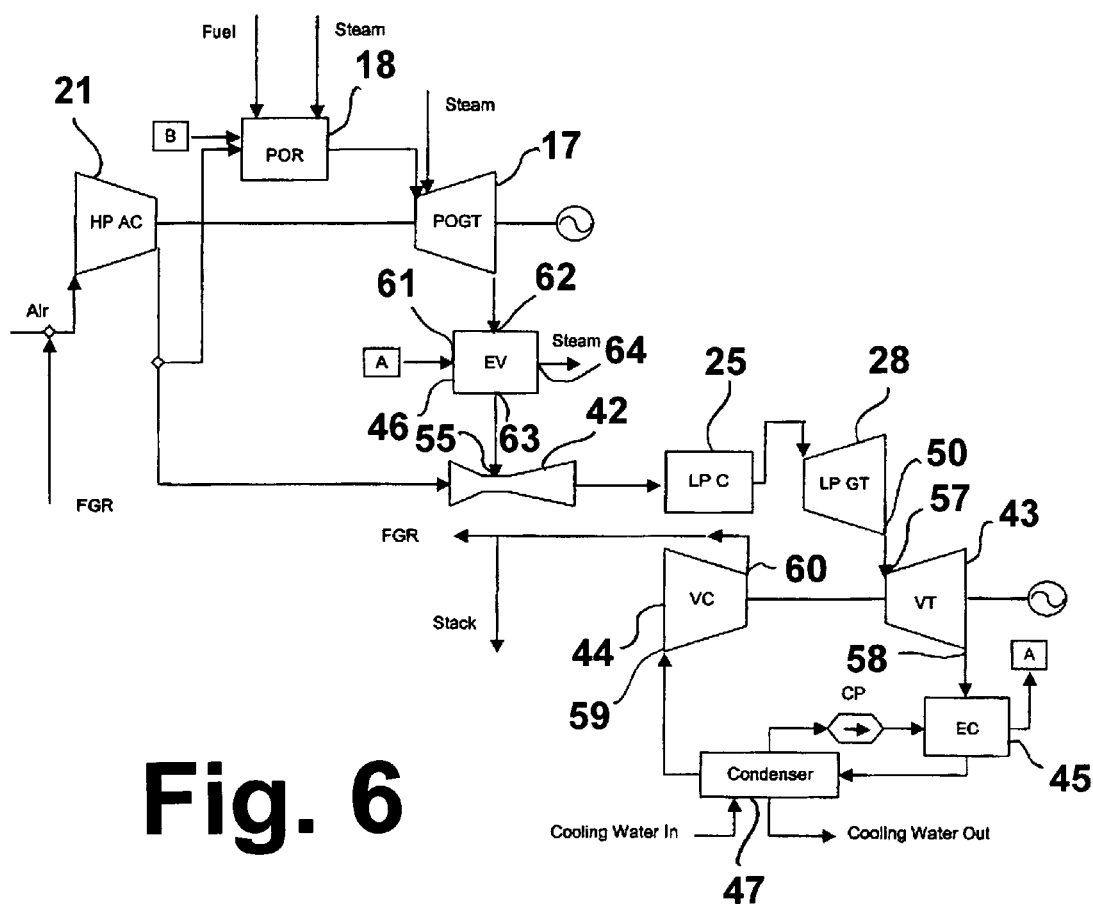
FIG. 6 is a schematic diagram of an air-staged power generation system employing a vacuum turbine in accordance with one embodiment of this invention.
Figure 7:
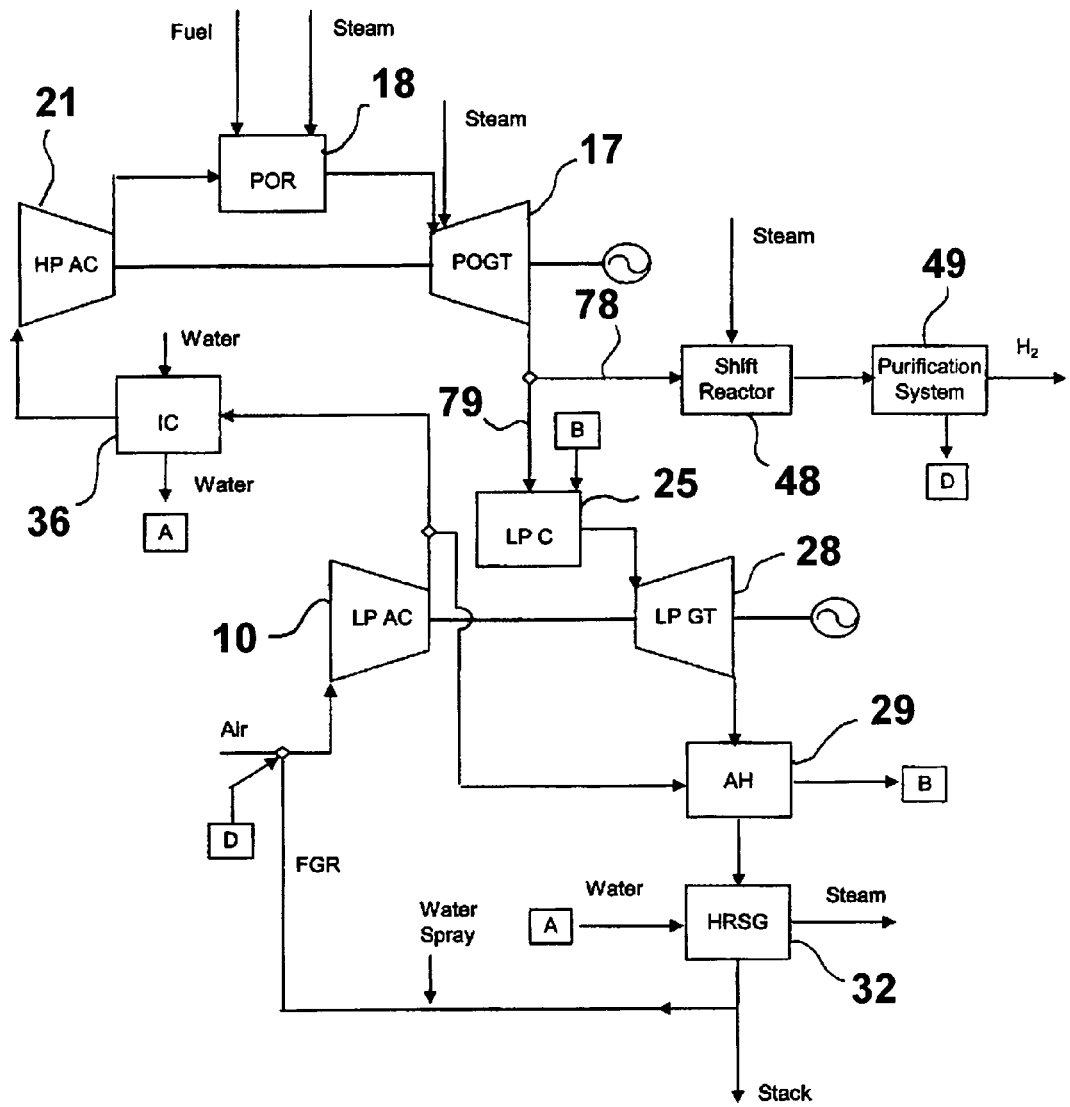
FIG. 7 is a schematic diagram of an air-staged power generation system employing a shift reactor and purification system in accordance with one embodiment of this invention.
Figure 8:
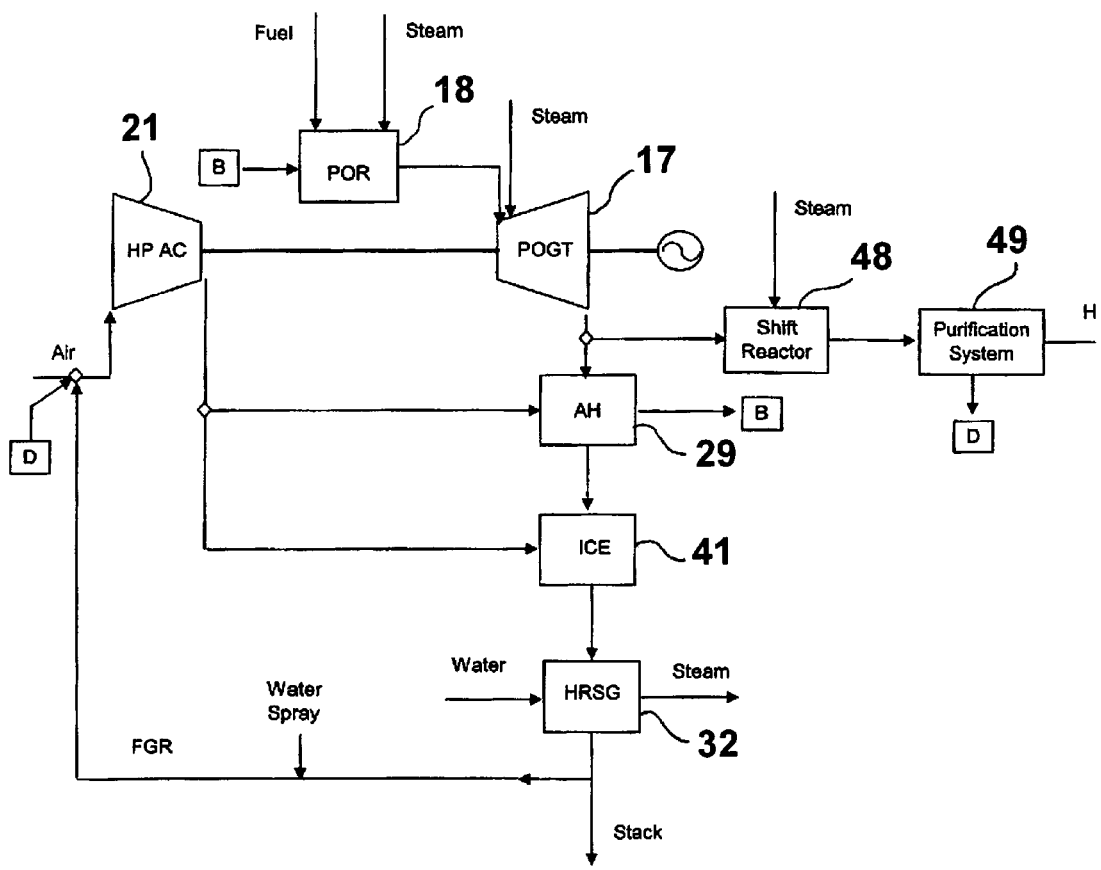
FIG. 8 is a schematic diagram of an air-staged power generation system employing an internal combustion engine, shift reactor, and purification system in accordance with one embodiment of this invention.
Figure 9:
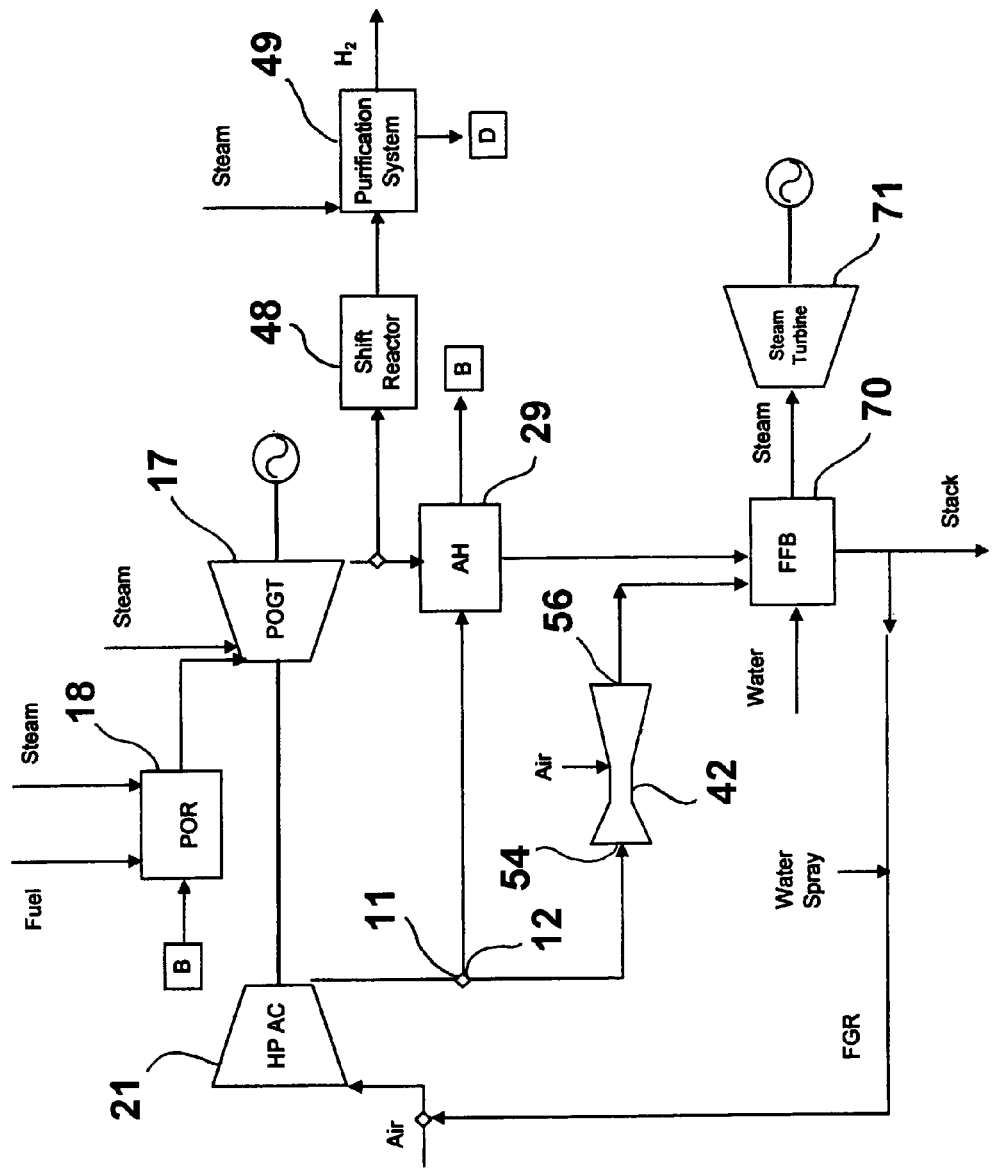
FIG. 9 is a schematic diagram of an air-staged power generation system corresponding to the system of FIG. 3, but with the addition of a shift reactor and purification system in accordance with one embodiment of this invention.
Figure 10:
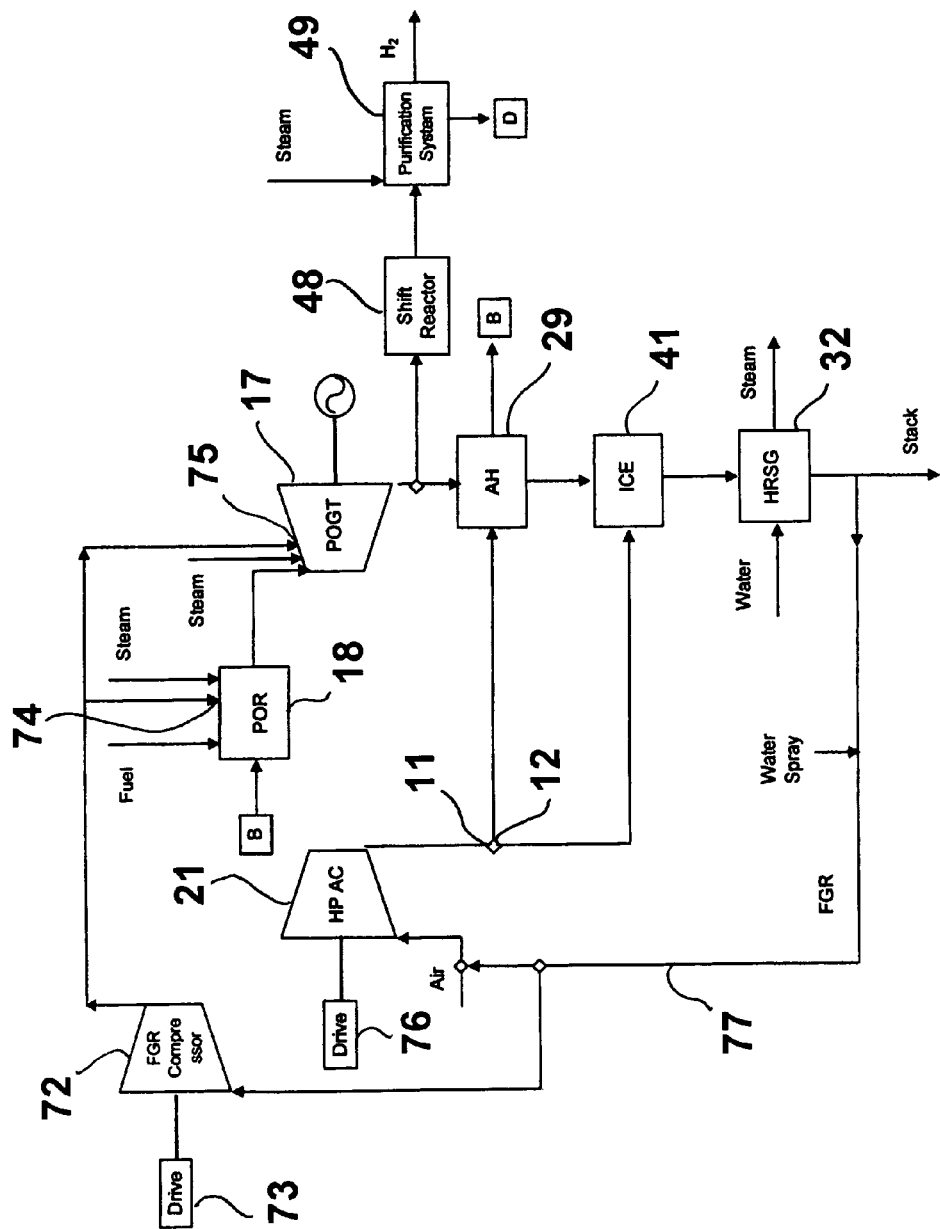
FIG. 10 is a schematic diagram of air-staged power generation system corresponding to the system of FIG. 4, but with the addition of a shift reactor and purification system in accordance with one embodiment of this invention.
Figure 11:
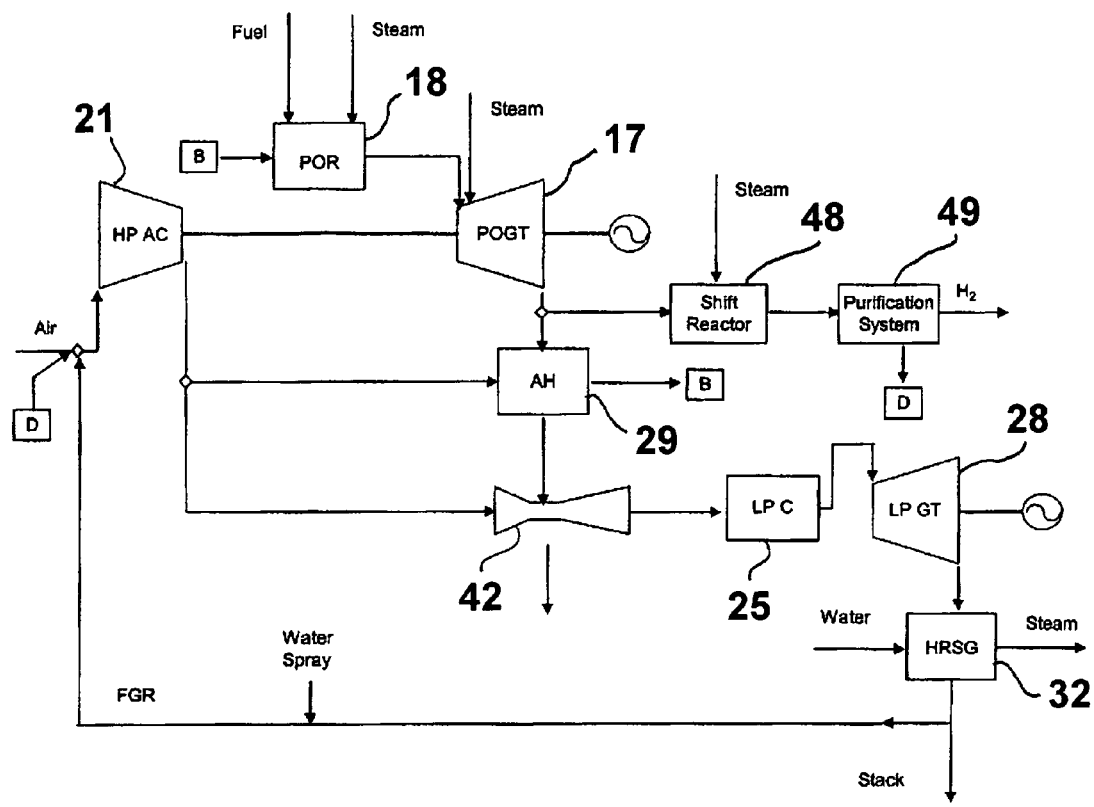
FIG. 11 is a schematic diagram of an air-staged power generation system employing a shift reactor and purification system in accordance with one embodiment of this invention.
Figure 12:
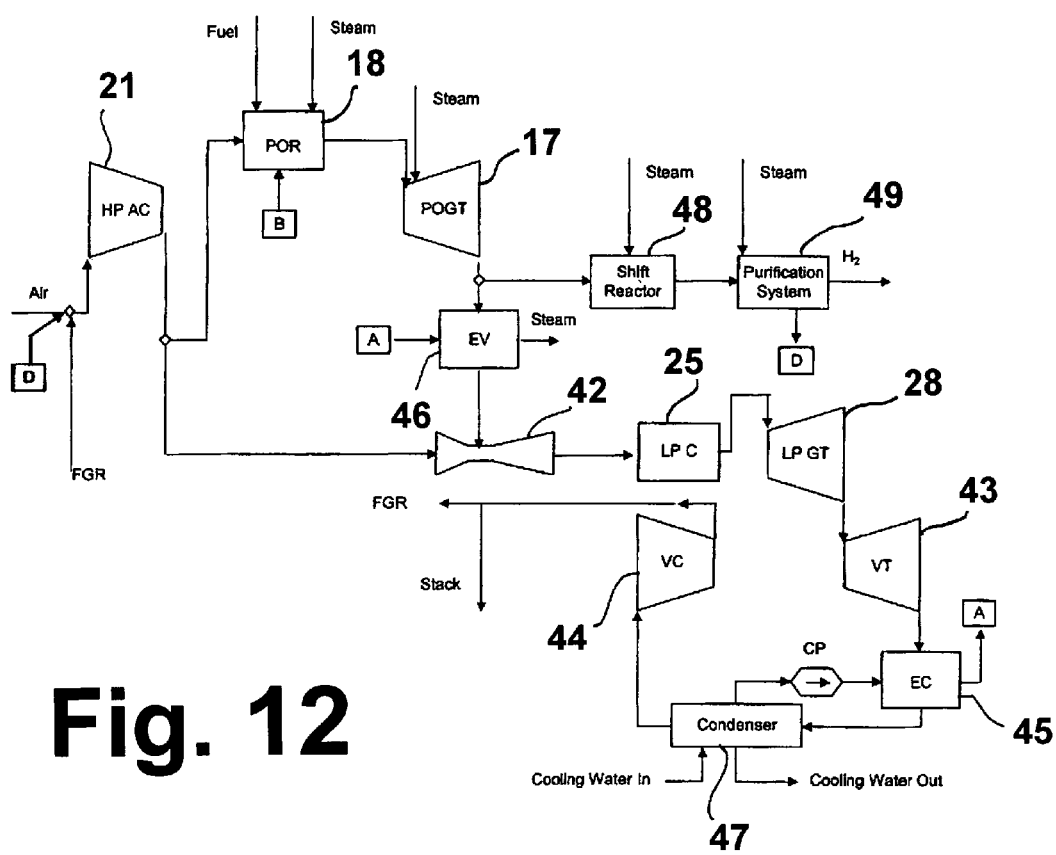
FIG. 12 is a schematic diagram of an air-staged power generation system employing a vacuum turbine, shift reactor and purification system in accordance with one embodiment of this invention.

In accordance with one embodiment of this invention as shown in FIG. 6, a vacuum turbine 43 having a vacuum turbine exhaust gas inlet 57 in fluid communication with turbine exhaust gas outlet 50 of low-pressure gas turbine 28 and having a vacuum turbine exhaust gas outlet 58 is added to the second stage of the power generation system to provide further expansion of the working fluid, i.e. turbine exhaust gas, for additional power generation. The vacuum turbine exhaust gas outlet is in fluid communication with economizer 45 in which the vacuum turbine exhaust gas is cooled down, water vapors from the economizer are condensed in a condenser 47 and the noncondensible gases (nitrogen, carbon dioxide, and oxygen) are sucked out of condenser 47 by a vacuum compressor 44. Vacuum compressor 44 has a noncondensible gas inlet 59 in fluid communication with condenser 47 and a compressed noncondensible gas outlet 60 through which the compressed noncondensible gases are exhausted. In accordance with one preferred embodiment of this invention, the compressed noncondensible gases are recirculated (FGR) to high-pressure air compressor 21.

In accordance with one embodiment of this invention as shown in FIG. 6, inducer exhaust gas inlet 55 of inducer 42 is in fluid communication with evaporator exhaust gas outlet 63.

FIGS. 7-12 show additional embodiments of the air-staged power generation system of this invention. These embodiments are similar to the embodiments shown in FIGS. 1-6 but include splitting of the exhaust gas from the partial oxidation gas turbine 17 into two streams 78 and 79, one of which is employed for power generation and the other of which is employed for hydrogen production. Stream 78 is introduced into a shift reactor 48 in which steam is also added to convert carbon monoxide (CO) in the exhaust gases from the partial oxidation gas turbine into hydrogen, $H_2$, and carbon dioxide, $CO_2$; and stream 79 is fed to the second stage of the power generation system. The exhaust from the shift reactor 48 is then fed to a purification system 49 in which hydrogen at the required purity is produced and the off gas is fed back to the system, for example to the recirculated exhaust gas and air mixture at the air inlet 67 to low pressure air compressor 10.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A power generation system comprising:
   a compressed air source having first and second compressed air outlets;
   a first stage electrical power generation means for generating a first electrical power output adapted to receive a first portion of compressed air from said compressed air source and having a first stage compressed air inlet in fluid communication with said first compressed air outlet;
   a second stage electrical power generation means for generating a second electrical power output adapted to receive a second portion of compressed air from said compressed air source and having a second stage compressed air inlet in fluid communication with said second compressed air outlet;
   fuel source means for providing 100% of a fuel for said power generation system to said first stage electrical power generation means; and
   fluid communication means for providing fluid communication between a first stage exhaust gas outlet of said first stage electrical power generation means and a fuel inlet of said second stage electrical power generation means.

2. A power generation system in accordance with claim 1, wherein said first stage electrical power generation means comprises a partial oxidation reactor having a high-pressure reactor compressed air inlet, a fuel inlet and a reactor exhaust gas outlet, and a partial oxidation gas turbine having a high-pressure turbine exhaust gas inlet in fluid communication with said reactor exhaust gas outlet and a turbine exhaust gas outlet corresponding to said first stage exhaust gas outlet.

3. A power generation system in accordance with claim 2, wherein said first stage electrical power generation means comprises a high-pressure air compressor having a high-pressure air compressor air inlet corresponding to said first stage compressed air inlet and having a high-pressure compressed air outlet in fluid communication with said high-pressure reactor compressed air inlet.

4. A power generation system in accordance with claim 3, wherein said high-pressure air compressor is connected with drive means for driving said high-pressure air compressor.

5. A power generation system in accordance with claim 4, wherein said drive means comprises a drive shaft connecting said high-pressure air compressor with said partial oxidation gas turbine.

6. A power generation system in accordance with claim 4, wherein said drive means comprises one of an electrical motor, an internal combustion engine and a separate gear box connected with a turbine shaft.

7. A power generation system in accordance with claim 2, wherein said second stage electrical power generation means has a second stage fuel inlet in fluid communication with said turbine exhaust gas outlet.

8. A power generation system in accordance with claim 7, wherein said second stage electrical power generation means comprises a power generation unit selected from the group consisting of a gas turbine, an internal combustion engine, a Stirling engine, a vacuum turbine, a fuel-fired boiler, and combinations thereof, said power generation unit having a second stage exhaust gas inlet.

9. A power generation system in accordance with claim 8, wherein said second stage electrical power generation means further comprises a low-pressure combustor having a combustor fuel inlet corresponding to said second stage fuel inlet and having a low-pressure combustor exhaust gas outlet, said low-pressure combustor exhaust gas outlet in fluid communication with said second stage exhaust gas inlet.

10. A power generation system in accordance with claim 1 further comprising an air heater in heat exchange communication with an exhaust gas from said second stage power generation means, said air heater having a cool compressed air inlet in fluid communication with said second compressed air outlet and having a heated compressed air outlet in fluid communication with said second stage compressed air inlet of a low-pressure combustor.

11. A power generation system in accordance with claim 10 further comprising a heat recovery steam generator in heat exchange communication with said exhaust gas downstream of said air heater and having a water inlet, a steam outlet, and a spent exhaust gas outlet.

12. A power generation system in accordance with claim 11, wherein said spent exhaust gas outlet is in fluid communication with said compressed air source.

13. A power generation system in accordance with claim 1 further comprising an intercooler having an intercooler water inlet, an intercooler water outlet, an intercooler compressed air inlet in fluid communication with said first compressed air outlet, and an intercooler compressed air outlet in fluid communication with said first stage compressed air inlet.

14. A power generation system in accordance with claim 13, wherein said the intercooler water outlet is in fluid communication with a steam generator water inlet.

15. A power generation system in accordance with claim 3 further comprising a shift reactor having a shift reactor fuel gas inlet in fluid communication with said fuel gas outlet and having a shift gas outlet.

16. A power generation system in accordance with claim 15 further comprising a hydrogen purification system having a shift gas inlet in fluid communication with said shift gas outlet.

* * * * *